United States Patent
Ain

(10) Patent No.: US 10,002,117 B1
(45) Date of Patent: Jun. 19, 2018

(54) TRANSLATING ANNOTATION TAGS INTO SUGGESTED MARKUP

(71) Applicant: GOOGLE INC., Mountain View, CA (US)

(72) Inventor: Joshua Daniel Ain, Somerville, MA (US)

(73) Assignee: GOOGLE LLC, Mountain View, CA (US)

( * ) Notice: Subject to any disclaimer, the term of this patent is extended or adjusted under 35 U.S.C. 154(b) by 254 days.

(21) Appl. No.: 14/062,498

(22) Filed: Oct. 24, 2013

(51) Int. Cl.
*G06F 17/24* (2006.01)

(52) U.S. Cl.
CPC .................................. *G06F 17/241* (2013.01)

(58) Field of Classification Search
CPC ... G06F 17/218; G06F 17/241; G06F 17/2247
See application file for complete search history.

(56) References Cited

U.S. PATENT DOCUMENTS

| | | | |
|---|---|---|---|
| 7,502,770 B2 | 3/2009 | Hillis et al. | |
| 7,587,387 B2 | 9/2009 | Hogue | |
| 7,765,206 B2 | 7/2010 | Hillis et al. | |
| 7,769,579 B2 | 8/2010 | Zhao et al. | |
| 7,774,328 B2 | 8/2010 | Hogue et al. | |
| 7,792,837 B1 | 9/2010 | Zhao | |
| 7,925,610 B2 | 4/2011 | Elbaz et al. | |
| 8,122,026 B1 | 2/2012 | Laroco et al. | |
| 8,204,856 B2 | 6/2012 | Meyer et al. | |
| 2003/0018668 A1* | 1/2003 | Britton et al. | 707/513 |
| 2004/0090458 A1* | 5/2004 | Yu | G06F 9/45512 715/760 |
| 2005/0091604 A1* | 4/2005 | Davis | G06F 3/0482 715/772 |
| 2005/0108630 A1* | 5/2005 | Wasson | G06F 17/241 715/230 |
| 2010/0121839 A1 | 5/2010 | Meyer et al. | |
| 2010/0145902 A1 | 6/2010 | Boyan | |
| 2010/0223214 A1 | 9/2010 | Kirpal et al. | |

(Continued)

FOREIGN PATENT DOCUMENTS

WO  2010085523 A1  7/2010

OTHER PUBLICATIONS

Siegfried Handschuh, Steffen Staab, and Alexander Maedche, "CREAM—Creating relational metadata with a component-based, ontology-driven annotation framework," copyright 2001, published by citeseerx.ist.psu.edu, pp. 1-14, http://citeseerx.ist.psu.edu/viewdoc/download?doi=10.1.1.21.3877&rep=rep1&type=pdf.*

(Continued)

*Primary Examiner* — Frank D Mills
*Assistant Examiner* — Warren Campbell, Jr.
(74) *Attorney, Agent, or Firm* — Brake Hughes Bellermann LLP

(57) ABSTRACT

A system and method includes translating a web page into a structured tree including a set of nodes. The system receives an annotation tag based on a selection of a portion of the web page. The system translates the annotation tag into a markup. The system attaches the markup to a first node of the nodes. The system applies the markup to at least one parent node in the structured tree that is related to the first node. The system outputs a new version of the web page in a source format, including the markup.

20 Claims, 11 Drawing Sheets

(56) References Cited

U.S. PATENT DOCUMENTS

2010/0257440 A1    10/2010    Kshirsagar et al.

OTHER PUBLICATIONS

Ali Khalili, Soren Auer, and Daniel Hladky, "The RDFa Content Editor—From WYSIWYG to WYSIWYM," copyright Jul. 2012, published in Computer Software and Applications Conference (COMPSAC), 2012 IEEE 36th Annual, pp. 531-540.*

Ali Khalili, Soren Auer, and Daniel Hladky, "The RDFa Content Editor—From WYSIWYG to WYSIWYM", copyright Jul. 2012, published in Computer Software and Applications Conference (COMPSAC), 2012 IEEE 36th Annual, pp. 531-540.*

Ali Khalili, Soren Auer, and Daniel Hladky, "The RDFa Content Editor—From WYSIWYG to WYSIWYM," copyright Jul. 2012, published in Computer Software and Applications Conference (COMPSAC), 2012 IEEE 36th Annual, Figure 2—"Annotation User Interface".*

Aditya Kalyanpur, James Hendler, Bijan Parsia, and Jennifer Golbeck, "SMORE—Semantic Markup, Ontology, and RDF Editor," copyright 2006, published by www.dtic.mil, http://www.dtic.mil/dtic/tr/fulltext/u2/a447989.pdf, pp. 1-6.*

Norbaitiah Ambiah and Dickson Lukose, "Enriching Webpages with Semantic Information," copyright 2012, published in Proceeding DCMI'12 Proceedings of 2012 International Conference on Dublin Core and Metadata Applications, pp. 1-11.*

Lancejpollard, "Complete List of HTML Meta Tags—GitHub," copyright 2012, GitHub, https://gist.github.com/lancejpollard/1978404, pp. 1-4.*

Ali Khalili and Soren Auer, "WYSIWYM authoring of structured content based on Schema.org," copyright 2013, WISE: The 14th International Conference on Web Information Systems Engineering—Oct. 13-15, 2013, pp. 1-14 (Year: 2013).*

Hill, "Structured Data First Steps: Adding Schema Location Markup to Your Website", retrieved from http://searchenginewatch.com/article/2216894/Structured-Data-First-Steps-Adding-Schema-Location-Markup-to-Your-Website, Oct. 16, 2012, 6 pages.

* cited by examiner

FIG. 3B

HTML Source with Microdata Markup
Add highlighted text to your html

```
<span><a href="/venues/1300-roxy-theatre">Venue info and map</a></span>
<span class="geo">
    <abbr Class="latitude" title="34.090712"></abbr>
    <abbr Class="longitude" title="-118.387966"></abbr>
</span>
<div class="line-up">
<h4>Line-up</h4>
<ul>
<li class="headliner">
    <a href="/artists/472109-ryan-leslie">
    <span itemprop="performer" itemtype="http://schema.org/person">
    <span itemprop="name">Ryan Leslie</span></a>
</li>
    <a href="/artists/3943396-max-and-the-moon">
    <span itemprop="performer" itemtype="http://schema.org/Person">
    <span itemprop="name">Max and the Moon</span></span>
</li>
    <a href="/artists/5397888-blac-jesus-and-the-experimentalists">
    <span itemprop="performer" itemtype="http://schema.org/Person">
    <span itemprop="name">Blac Jesus & the Experimentalists</span></span></a>
</li>
    <a href="/artists/5880389-battle-me">
    <span itemprop="performer" itemtype="http://schema.org/Person">
    <span itemprop="name">Battle me</span></span></a>
</li>
</ul>
</div>
</div>
```

FIG. 4

TRANSLATING ANNOTATION TAGS INTO SUGGESTED MARKUP

BACKGROUND

Information and data available through the Internet are only available in a format chosen by those who control the data. To provide the ability to collect, access, and analyze data which the analyzer does not control, for example by search engines, tools have been developed to extract data from various data sources such as web pages.

Webmasters may wish to add schema.org markup to a webpage or HTML email in ways recognized by major search providers. Search engines may rely on this markup to improve the display of search results, making it easier for people to find the right web pages. To assist in adding markup, some systems may mark up an example page, and send this page to the webmaster. Then the webmaster may add markup which is not entirely correct, and the webmaster may then have to iterate several times with a search engine provider before getting the markup correct. Working directly with the webmaster also does not scale to the entire web. Thus, there exists a need for a self-service, interactive tool to help webmasters more easily add schema.org annotations to their webpages or HTML emails.

SUMMARY

A point and click tool allows users to visually mark up important information on a webpage, for example by highlighting the information on a screen, and annotate it with a schema.org annotation. The tool generates markup based on user input, and generates a new file containing the original source such as HTML (from the rendered content of the webpage), with the markup.

In one implementation, a method includes translating, by a processor of a computer device, a web page into a structured tree including a set of nodes; receiving, by the processor, an annotation tag based on a selection of a portion of the web page; translating, by the processor, the annotation tag into a markup; attaching, by the processor, the markup to a first node of the nodes; applying, by the processor, the markup to at least one parent node in the structured tree that is related to the first node; and outputting, by the processor, a new version of the web page in a source format, including the markup.

Other implementations of this aspect include corresponding systems, apparatus, and computer programs, configured to perform the actions of the methods, encoded on computer storage devices. These and other implementations can each include one or more of the followings features. The method may include determining, by the processor, the parent node in the structured tree that is related to the first node by traversing the structured tree from the first node for any nodes that contain properties of the annotation tag associated with the first node. The method may include receiving an annotation associated with the selection. The method may include determining if the annotation tag crosses multiple node boundaries, and inserting the new span. The method may include upon determining that the annotation tag crosses the multiple node boundaries in such a way that the new span encompasses the content as well as extra content, inserting a meta tag. The new version of the web page may be based on the structured tree. The markup may be in an HTML5 microdata format. The method may include matching, by the processor, the selection to the first node. The outputting may include highlighting the markup in the source format.

One or more of the implementations of the subject matter described herein may provide one more of the following advantages. The self-service tool helps webmasters make web pages more easily searchable using search engines by letting the webmasters add schema.org annotations to their web pages or HTML emails.

The details of one or more implementations are set forth in the accompanying drawings and the description below. Other features will be apparent from the description and drawings, and from the claims.

BRIEF DESCRIPTION OF DRAWINGS

FIG. 3B is an example of a user interface that may be used for adding user input to a starting web page, consistent with disclosed implementations.

FIG. 4 is an example user interface including markup in HTML source format, consistent with disclosed implementations.

Like reference symbols in the various drawings indicate like elements.

DETAILED DESCRIPTION

Figure 1:
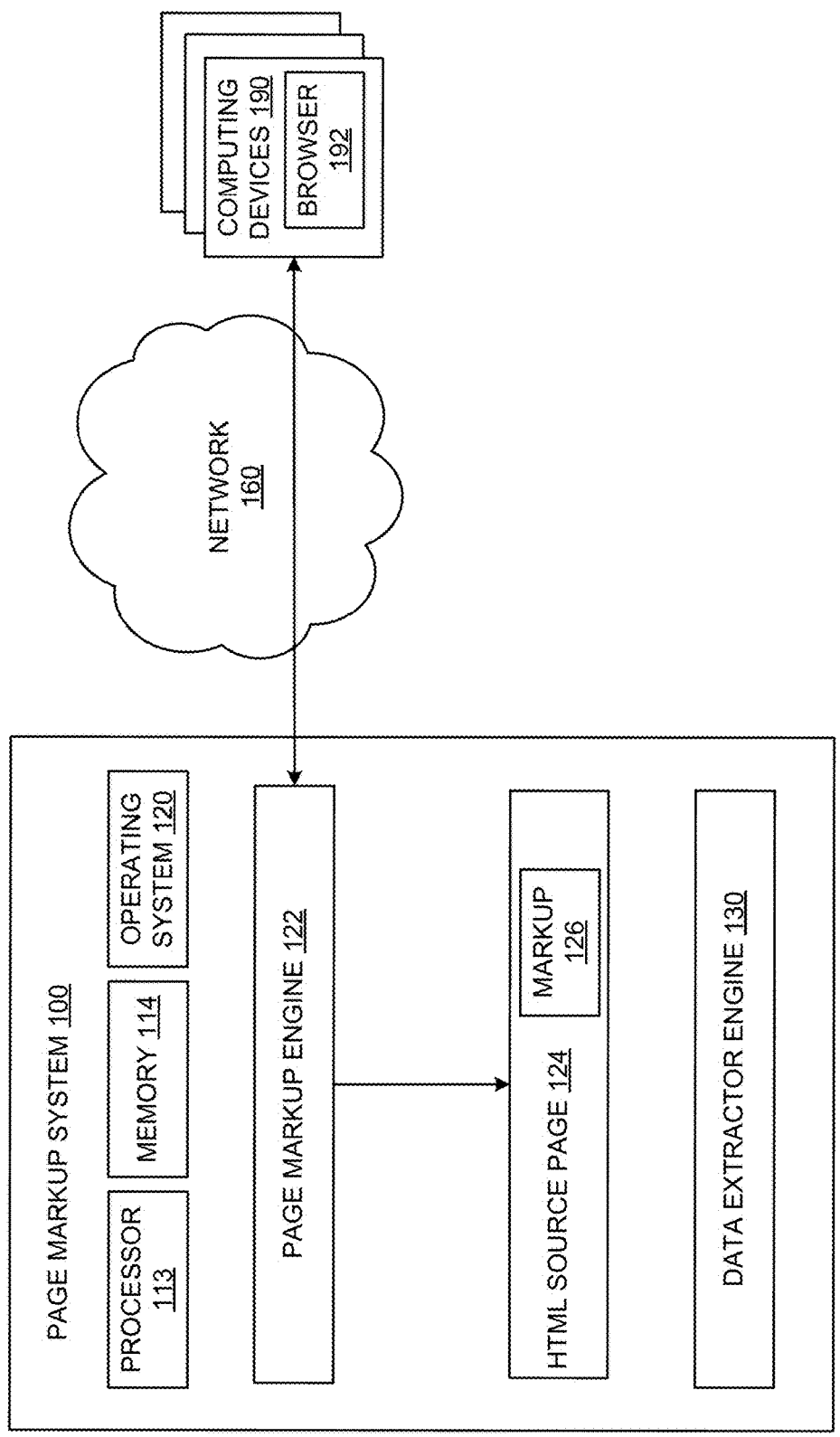
FIG. 1 illustrates an example system in accordance with the disclosed subject matter.

FIG. 1 is a block diagram of a page markup system 100 in accordance with an example implementation. The page markup system 100 may be used to implement the data extraction techniques described herein. The depiction of page markup system 100 in FIG. 1 is described as a system for extracting data from web pages available over the Internet, but it will be appreciated that the data extraction techniques described may be used to extract data from other data sources, such as HTML emails.

The page markup system 100 may be a computing system that takes the form of a number of different devices, for example, a standard server, a group of such servers, or a rack server system. In some implementations, page markup system 100 may be implemented in a personal computer, or a laptop computer, as described in more detail below with respect to FIGS. 9 and 10.

Page markup system 100 can include one or more processors 113 configured to execute one or more machine executable instructions or pieces of software, firmware, or a combination thereof. The page markup system 100 can include an operating system 120 and one or more computer memories 114, for example a main memory, configured to store data, either temporarily, permanently, semi-permanently, or a combination thereof. The memory 114 may include any type of storage device that stores information in a format that can be read and/or executed by processor 113. Memory 114 may include volatile memory, non-volatile memory, or a combination thereof. In some implementations information may be stored in an external storage device (not shown) and loaded into memory 114.

In addition to operating system 120, the system 100 may also include a page markup engine 122. The page markup engine 122 may provide at least one interface to allow a user of a computing device 190 to insert markup into a web page, such as microdata markup. HTML5 microdata is a way to label content to describe a specific type of information—for example, reviews, person information, or events in a web page or other HTML document such as HTML email. Each information type describes a specific type of item, such as a person, and event, or a review. For example, an event has the properties of venue, starting time, name, and category. Microdata uses simple attributes in HTML (such as <span> or <div>) to assign brief and descriptive names to items and properties. An example of HTML that describes an event is:

<div>

Come hear the Tiny Tim Tribute Band, live in concert on July 6, 2013 at the beautiful Regency Theater!

</div>

An example of the same HTML with microdata markup is:

<div itemscope itemtype="http://schema.org/Event">

Come hear the <span itemprop="name">Tiny Tim Tribute Band</span>, live in concert on <span itemprop="startDate" content="2013-07-

06>July 6, 2013</span> at the beautiful

<span itemprop="location" itemscope itemtype="http://schema.org/Place"><span itemprop="name">Regency Theater</span>!</span>

</div>

In some cases, a web page may have multiple events, each including names, dates, addresses, etc. In some implementations, the page markup engine 122 may locate a best common ancestor DOM node for a property (e.g., an address) or may use HTML itemref to add markup to the DOM node, as explained in more detail below, for example with respect to FIG. 6.

The page markup engine 122 may generate, based on user's input such as annotations provided to the page markup engine 122, a new HTML source page 124 including markup 126, as described in more detail below with respect to FIGS. 3-6. The page markup system 100 may output the new HTML source page 124, for example by displaying the HTML source page 124 with the markup 126 highlighted for the user in a graphical user interface. The HTML source page 124 may be formatted in the same way that it is on the original HTML page, with additional attributes to attach the appropriate markup to the page. In this way, a user may learn how to add markup to their webpages or HTML emails.

In some cases, various forms of markup 126 may be used, in addition to or as an alternative to microdata. For example, JSON-LD uses a JAVASCRIPT object in an HTML page to define data. Microdata and JSON-LD are two different ways to mark up data using the schema.org vocabulary. The system may use other forms of markup.

A user creating a markup page may use computing devices 190, which may be any type of computing device in communication with system 100, for example, over a network 160. Computing devices 190 may include desktops, laptops, netbooks, tablet computers, mobile phones, smart phones, televisions with one or more processors, etc. For example, computing devices 190 may be an example of computing device 950 of FIG. 9. In some implementations, a computing device 190 may be part of page markup system 100 rather than a separate computing device. In some implementations, the computing device 190 may include a web browser 192 that allows the user to communicate with system 100.

The page markup system 100 may also include a data extractor engine 130. The data extractor engine may extract structured data, such as markup 126, from a webpage and store it in a data store.

Page markup system 100 may be in communication with the computing devices 190 over network 160. Network 160 may be for example, the Internet or the network 160 can be a wired or wireless local area network (LAN), wide area network (WAN), etc., implemented using, for example, gateway devices, bridges, switches, etc. Via the network 160, the page markup system 100 may communicate with and transmit data from computing devices 190. As mentioned above, in some implementations computing devices 190 may be incorporated into and part of the system 100, making network 160 unnecessary.

Although FIG. 1 nominally illustrates a single computing device executing the page markup system 100, it may be appreciated from FIG. 1 and from the above description that, in fact, a plurality of computing devices, e.g., a distributed computing system, may be utilized to implement the system.

More generally, it may be appreciated that any single illustrated component in FIG. 1 may be implemented using two or more subcomponents to provide the same or similar functionality. Conversely, any two or more components illustrated in FIG. 1 may be combined to provide a single component which provides the same or similar functionality. Thus, FIG. 1 is illustrated and described with respect to example features and terminologies, which should be understood to be provided merely for the sake of example, and not as being at all limiting of various potential implementations of FIG. 1 which are not explicitly described herein.

Figure 2:
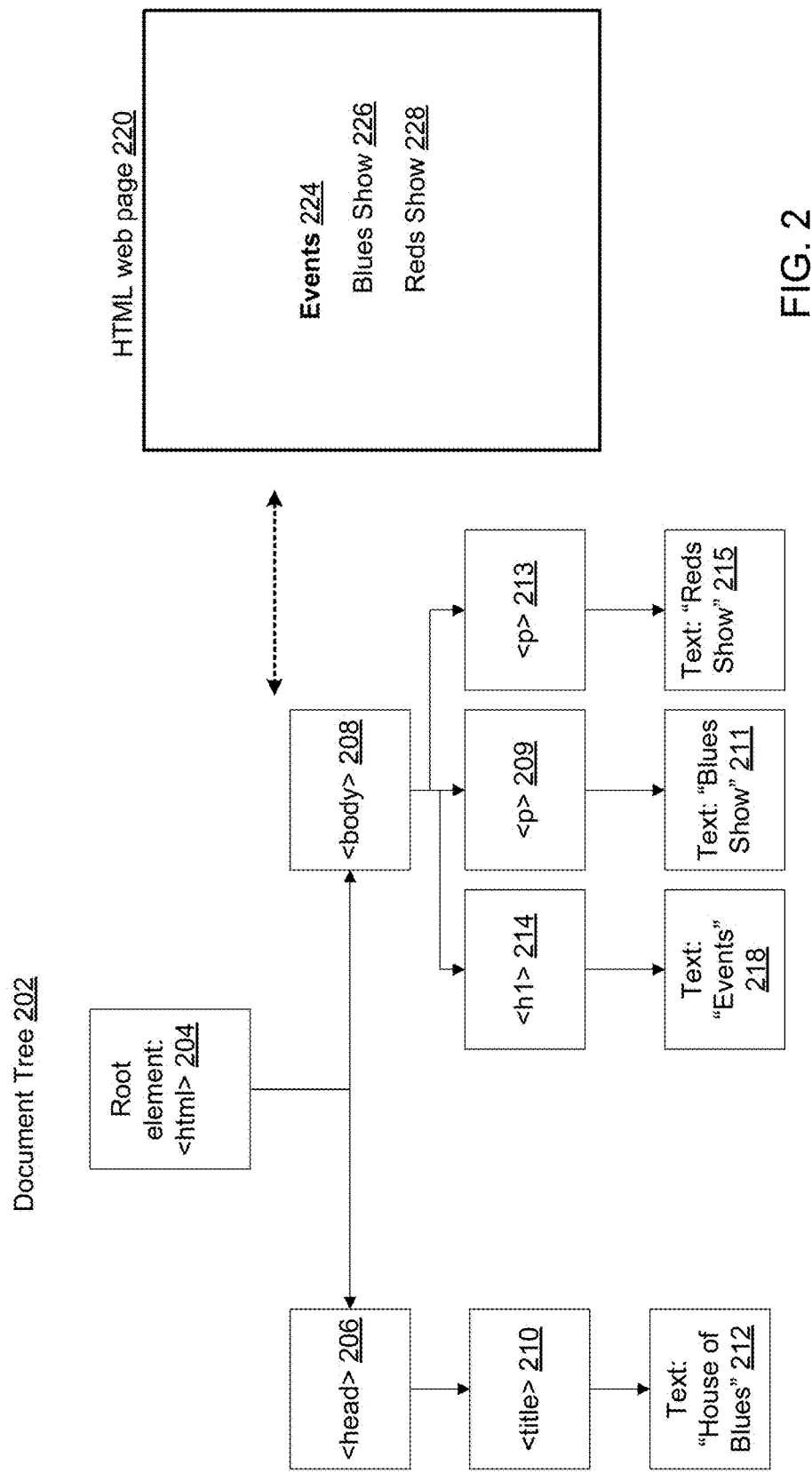
FIG. 2 illustrates example block diagram of a document object model (DOM) framework in accordance with the disclosed subject matter.

FIG. 2 is an example block diagram of a document object model (DOM) framework. As shown in FIG. 2, an HTML web page 220 may include various titles, headers, text, images, links, or other elements. For example, the web page 220 may include an "Events" element 224, a "Blues Show" element 226, and a "Reds Show" element 228.

The HTML web page 220 may be used to construct a document tree 202. In various implementations, the document tree 202 may be a tree based representation of the rendered HTML on the web page 220. The rendered HTML is distinguished from solely HTML, in that the document tree 202 may incorporate HTML that is generated by JAVASCRIPT or other means after the web page 220 loads or is rendered in a web browser, for example.

The document tree 202 may include a node 204, and one or more child nodes 206, 208, 209, 210, 211, 212, 214, 215, and 216, as examples. Document tree 202 could include any number of child nodes. The document tree 202 may be composed when rendered for example, by a renderer process of a browser, into the HTML web page 220.

In the example shown in FIG. 2, the nodes in the node tree have a hierarchical relationship to each other. The terms parent, child, and sibling are used to describe the relationships. Parent nodes have children. In a node tree, the top node is called the root. Every node has exactly one parent, except the root (which has no parent). A node can have any number of children. The root element <html> node 204 has no parent node as is the root node. The node 206 may represent a <head> element and its parent node is node 204. The node 210 may represent an <title> element and its parent node is node 206. The node 212 may represent a Text: "HOUSE OF BLUES" element and its parent node is node 210. The node 208 may represent a <body> element. The node 214 may represent an <h1> element. The node 218 may represent a text: "Events" element. The node 209 may represent an <p> element. The node 211 may represent a text "Blues Show" 211 element. The node 213 may represent another <p> element. The node 215 may represent a text "Reds Show" element. The HTML source for the HTML web page 220 may include, for example, the following:

<html>
   <head>
     <title>HOUSE OF BLUES </title>
   </head>
    <body>
  <h1>Events</h1>
    <p> Blues Show</p>
 <p> Reds Show</p>
  </body>
  </html>

In this example, the <html> node 204 has two child nodes: <head> 206 and <body> 208. The <head> node 206 has one child node: the <title> node 210. The <title> node 210 also has one child node: the text "HOUSE OF BLUES" node 212. The <head> node 206 is the first child of the <html> node 204. The <body> node 208 is the last child of the <html> node 204. The <h1> node 214 is the first child of the <body> node 208. Of course, other elements such as links, images, etc. may be included in the HTML web page 220.

Figure 3A:
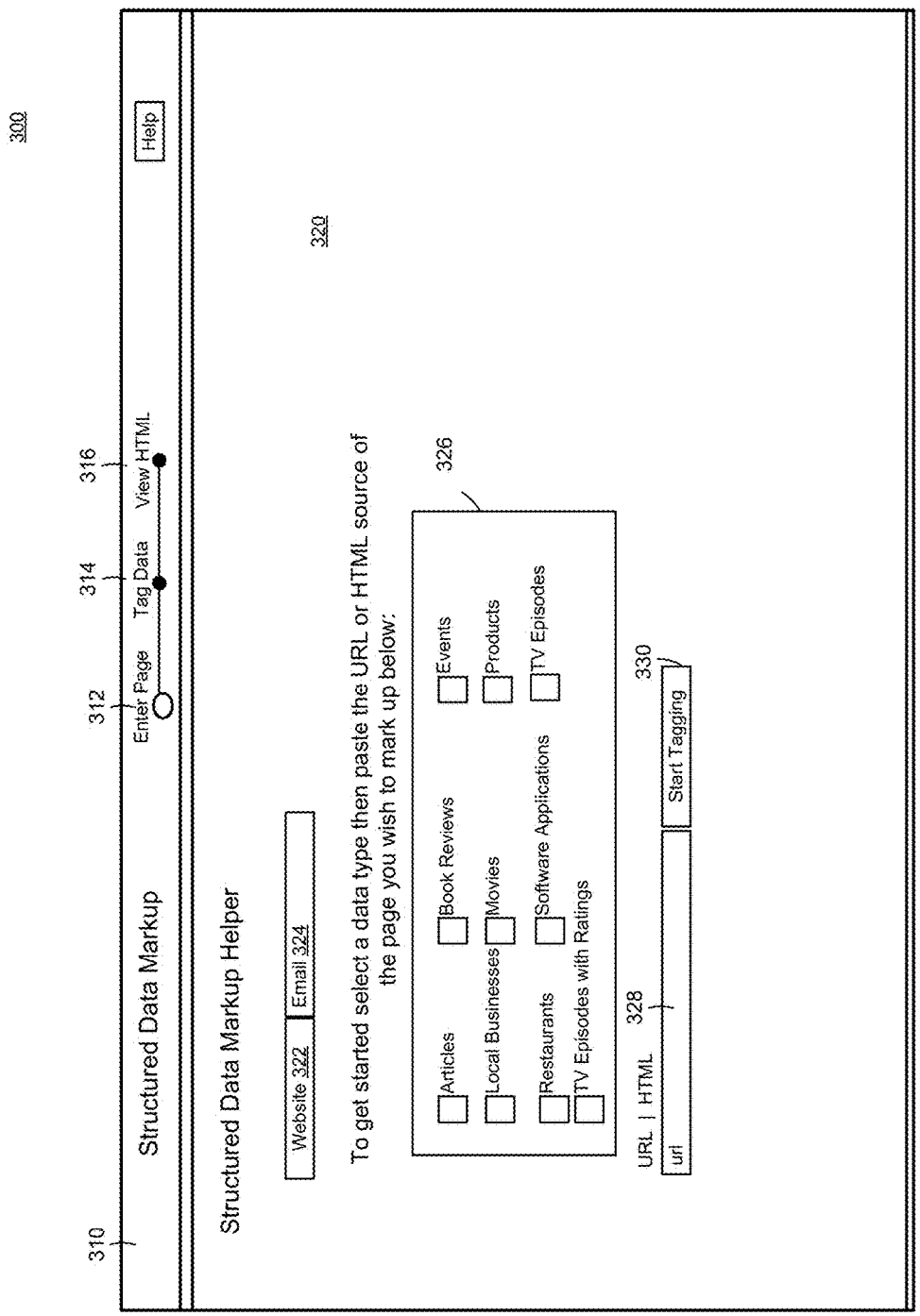
FIG. 3A is an example of a user interface that may be used for inputting starting web page, consistent with disclosed implementations.

FIG. 3A is an example of a user interface that may be used for inputting a starting web page, consistent with disclosed implementations. As shown in FIG. 3A, a graphical user interface 300 may include a toolbar 310. A webmaster or other user may access the graphical user interface 300 by navigating to a specific URL, for example. The toolbar 310 may include an "Enter Page" 312 element, a "Tag Data" 314 element, and a "View HTML" 316 element, among other elements. The graphical user interface 300 may also include an input area 320. The input area 320 may include a website element 322 and an email element 324. A user may select either the website element 322 or the email element 324 to input a website address or a block of HTML email, respectively. In the example shown in FIG. 3A, a user has selected the website element 322 or the tool may default to the website feature. The user may then select one of various data types 326, to specify the type of website. The data types 326 may include, for example, articles, local businesses, restaurants, tv episodes with ratings, book reviews, movies, software applications, events, products, or tv episodes, as examples. The system may use the selected data type to determine a schema for the web page, for example. The user may input a URL into input element 328 and select a "start tagging" element 330 to begin adding annotation tags to the web page, which may bring the user to another graphical user interface, as discussed in more detail below in FIG. 3B. In some implementations, the user may instead select the email element 324 to input a block of HTML source of the email the user wishes to mark up in an input element, and may begin annotating the HTML email.

Figure 3B:
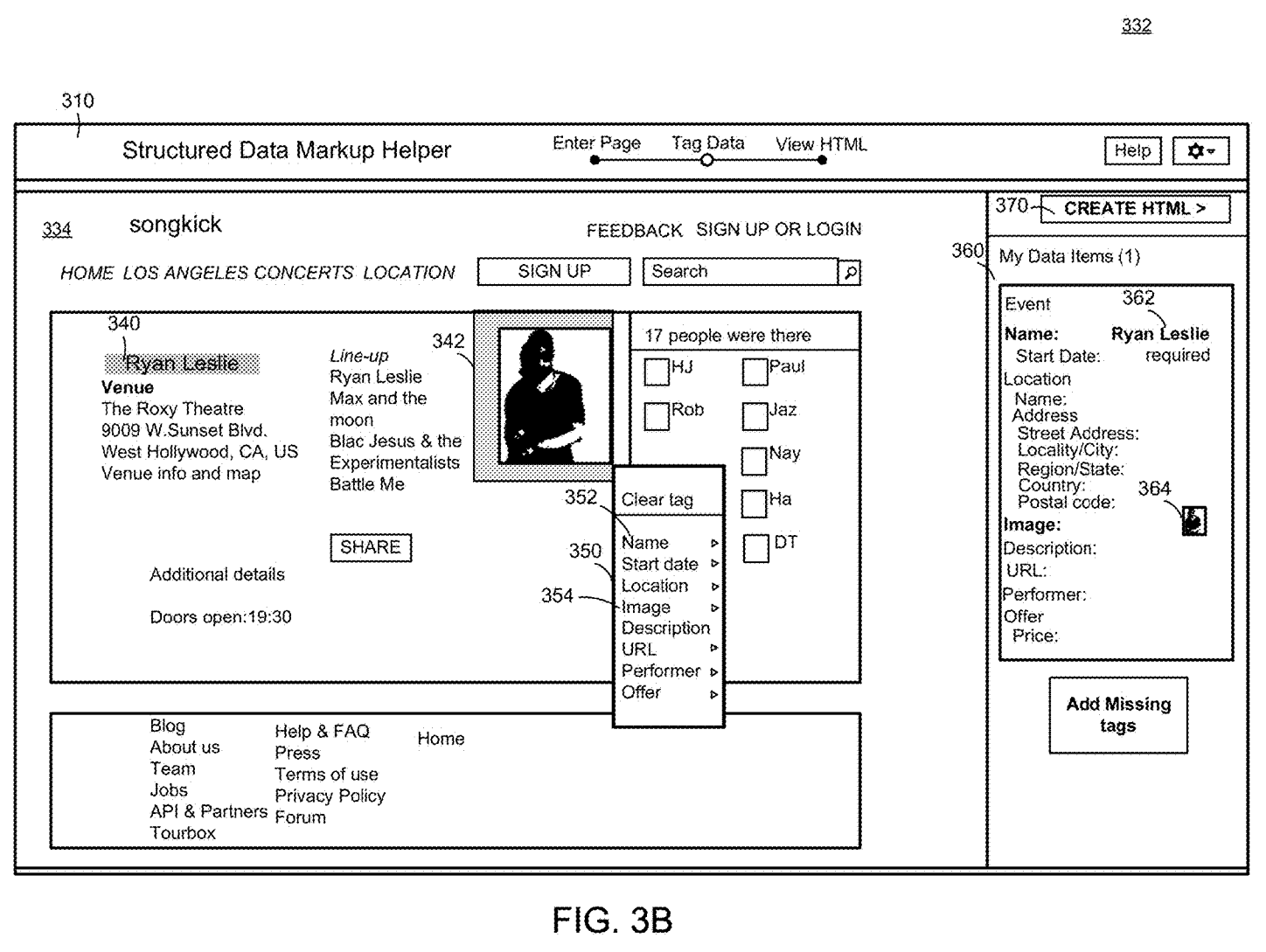

FIG. 3B illustrates a user interface that may be used for adding user input to a starting web page, consistent with disclosed implementations. The user interface 332 shown in FIG. 3B enables a user to select data items shown in a web page 334, and to assign the selected data items an annotation tag. For example, user interface 332 may allow a user to select rendered data items in web page 334 by highlighting the rendered data items. The rendered data items may include, for example, portions of text or images.

The system may utilize different types of annotation tags including direct annotation tags, indirect grouping annotation tags, and missing annotation tags. Direct annotation tags applied to the page are annotation tags based on a selection such as a highlighting a portion of the page. Direct annotation tags may also include a data format, such as a date. If the direct annotation tags include a data format, the direct annotation tags may output a content field with the parsed value of the content of the annotation tag. They may be composed of subcomponents. For instance, the year of a date may be tagged separately from or in addition to the month of the date. If this is the case, the resulting microdata may be attached to the date itself, or to the first subcomponent if no date is present.

Indirect grouping annotation tags are annotation tags that have properties that may be direct or indirect annotation tags. For instance, a location might have an address and a name.

Missing annotation tags are annotation tags that are filled in by default when a direct annotation tag is not present on the page. Though they are direct annotation tags in that they have content, they have no place on the page. As one example, a rendered web page may include an element displaying a name of a location with no address displayed. The system may receive an address as a missing annotation tag for the address. The system may find the existing annotation tag for the name elsewhere on the rendered page, and may insert the location as a DOM node above the name, and insert a meta tag representing an address of the location in a new version of the HTML web page.

In the example shown in FIG. 3B, the user has selected data items by highlighting areas 340 and 342 on the web page 334. The area 340 corresponds to the text "Ryan Leslie" and the area 342 corresponds to an image. Upon or after selecting a rendered data item, the user interface 332 may allow a user to select an item from a menu 350. The menu 350 may be a pop-up menu that includes types of available items. The types of available items may depend upon the schema that is based on the type of web page selected in FIG. 3A (e.g., Articles, Local Businesses, etc.).

Upon selecting a type of item, in this example "Name" item type 352, the system may highlight a corresponding field 362 in a window 360 for the user to enter the relevant text, in this case the name "Ryan Leslie." The relevant text may be used by the page markup engine 122 to create microdata markup. In some implementations, the system may automatically populate the relevant text or images. For example, upon selecting an image item type 354, the system may automatically insert a version of the image in field 364 in window 360.

The window 360 may include an area displaying assigned or suggested annotation tags. For example, one annotation tag may include "Name: Ryan Leslie" as shown in the window 360. The user may update or modify the annotation tags in the window 360 at any time, for example by selecting various elements of web page 334. This process of receiving data from the user may constitute adding annotation tags to the web page, and in some implementations, the data may be used by structured data extractors. The system may then add the marked up HTML to the webpage based on the annotation tags, for example upon receiving a user selection of the "Create HTML" button 370. The user may view the new HTML source, as explained in more detail below with respect to FIG. 4.

FIG. 4 is an example user interface including markup in HTML source format, consistent with disclosed implementations. The user interface 400 includes HTML source of a webpage with microdata markup shown in a highlighted format. In the example shown in FIG. 4, for example, the added microdata markup includes "<span itemprop="performer" itemscope itemtype="http://schema.org/person">" 410, "<span itemprop="name">" 412, and "</span></span>" 414. The system may highlight or otherwise emphasize the added microdata markup for the user, as illustrated by the boxes surrounding the added microdata markup in user interface 400. The system may allow a user to view the user interface 400 adjacent to the rendered webpage. In some implementations, the system may include tag navigators on the scroll bar 418 such as tag navigator 420. The tag navigators indicate where markup has been added in the page. Upon selection of tag navigator 420, the system may automatically scroll the window 411 to both a visual element associated with the annotation tag as shown in FIG. 3B, and to the added microdata markup corresponding to the tag navigator 420, as shown in FIG. 4. For example, in various implementations, the markup is highlighted, and clicking on the highlighted text scrolls the user to the corresponding visual element in the rendered web page as shown in FIG. 3B, such as the name "Ryan Leslie" in area 340. Interacting with the added markup in the HTML source will illustrate which elements the added markup corresponds to in the rendered web page. In some implementations, the rendered web page may be displayed adjacent to the user interface 400, for example.

Figure 5:
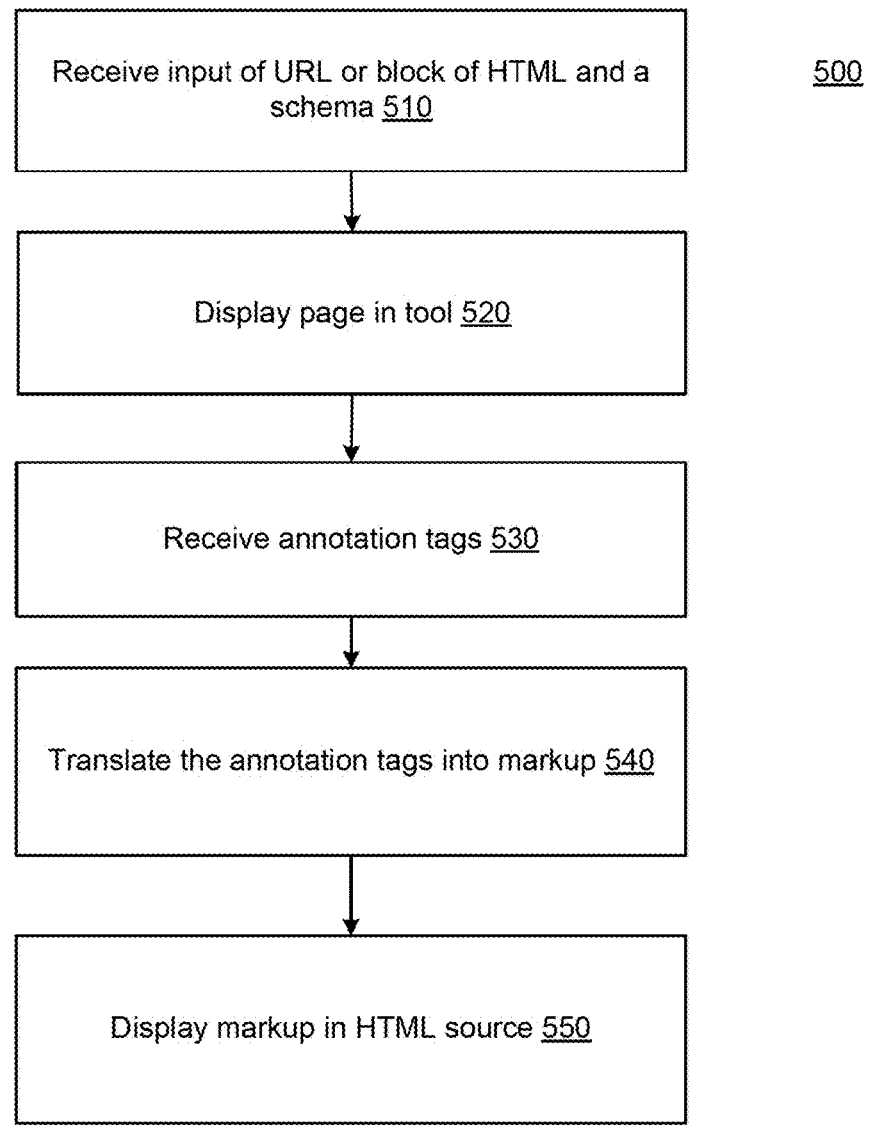
FIG. 5 is flow diagram illustrating a process for page markup, consistent with disclosed implementations.

FIG. 5 is flow diagram illustrating a process for page markup, consistent with disclosed implementations. The process shown in FIG. 5 may be implemented at least in part by the page markup system 100 shown in FIG. 1, for example using the page markup engine 122. The system may receive input of a URL or block of HTML and a schema (510), such as described above with respect to FIG. 3A. For example, the system may receive an input of the URL "www.houseofblues.com" and a data type "local businesses" corresponding to a schema. The system may display the page in the tool (520), for example as shown in FIG. 3B. The system may receive annotation tags from the user (530), for example as described above with respect to FIG. 3B. The system may translate the annotation tags into markup (540), as described in more detail below with respect to FIG. 6. The system may display markup in an HTML source format (550), for example as shown in FIG. 4 and as described in more detail below with respect to FIG. 6.

Figure 6:
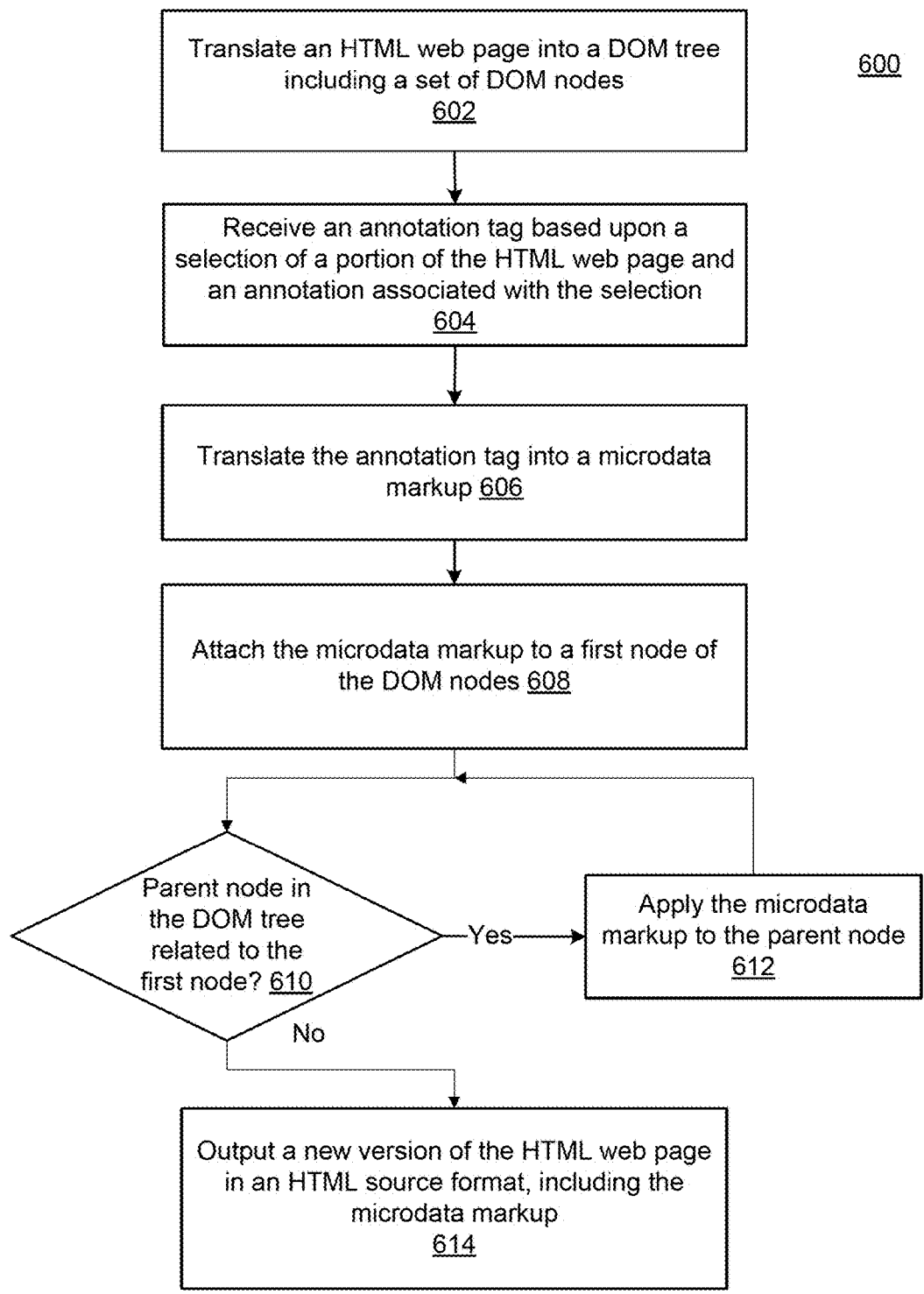
FIG. 6 is flow diagram illustrating a process for translating annotation tags into suggested page markup, consistent with disclosed implementations.

FIG. 6 is flow diagram illustrating a process for translating annotation tags into suggested page markup, consistent with disclosed implementations. The process shown in FIG. 5 may be implemented at least in part by the page markup system 100 shown in FIG. 1, for example using the page markup engine 122. The process may be performed as part of block 540 as shown in FIG. 5. The system may translate an HTML web page into a DOM tree including a set of DOM nodes (602). This is a tree based representation of the rendered HTML on the page, including HTML generated by JAVASCRIPT™ or other means after the page loads in a web browser. In some implementations, the system may build a mapping of DOM nodes into token numbers. In some implementations, the web page may be tokenized such that each taggable section of the web page has a token identifier.

The system may receive an annotation tag based upon a selection of a portion of the HTML web page and an annotation associated with the selection (604). For example, as shown in FIG. 3B, the system may receive a selection via a graphical user interface of the text "Ryan Leslie" in area 340, a selection of a "Name" item type 352 and an annotation "Ryan Leslie" in field 362. The annotation tag may include both the item type (e.g., Name) and the annotation (e.g., Ryan Leslie). The selection may be a highlighting, for example as shown in FIG. 3B. The annotation may be, for example, text or data that is selected from a predetermined list, data that is automatically populated by the page markup engine 122, or an input directly received from a user, as examples.

Turning back to FIG. 6, the system may translate the annotation tag into microdata markup (606). The system may match all tags to DOM nodes that contain them, as described in more detail below with respect to FIG. 7. The system may attach the microdata markup to a first node of the DOM nodes (608). In this example, the system attaches the microdata markup to the node associated with the text "Ryan Leslie". The system determines whether any parent node in the DOM tree is related to the first node (610), as described in more detail below with respect to FIGS. 7 and 8. If so, the system may apply the microdata markup to the parent node (612). The system may continue to walk up the DOM tree until it determines there are no parent nodes related to the first node (610, no). The system may output a new version of the HTML web page in an HTML source format including the microdata markup (614), for example as shown in FIG. 4. The microdata markup may be highlighted or otherwise indicated, for example, to illustrate for the user the changes to the original HTML source. The user may download, copy, or email the new HTML source file for use in a website.

In some implementations, the system may also provide the web page in a JSON-LD format, and the system translates the user tags into JSON-LD format. In some implementations, the system may also provide the web page in a Resource Description Framework in Attributes (RDFa) format. Additional or alternative implementations may instead include having a user fill out a set of forms and translating these forms data into markup. An advantage of using microdata is that the markup is associated with a visual element on the page. This reduces spam possibilities, makes the page more concise, and allows search engines to better understand how the structured data relates to the visual content.

Figure 7:
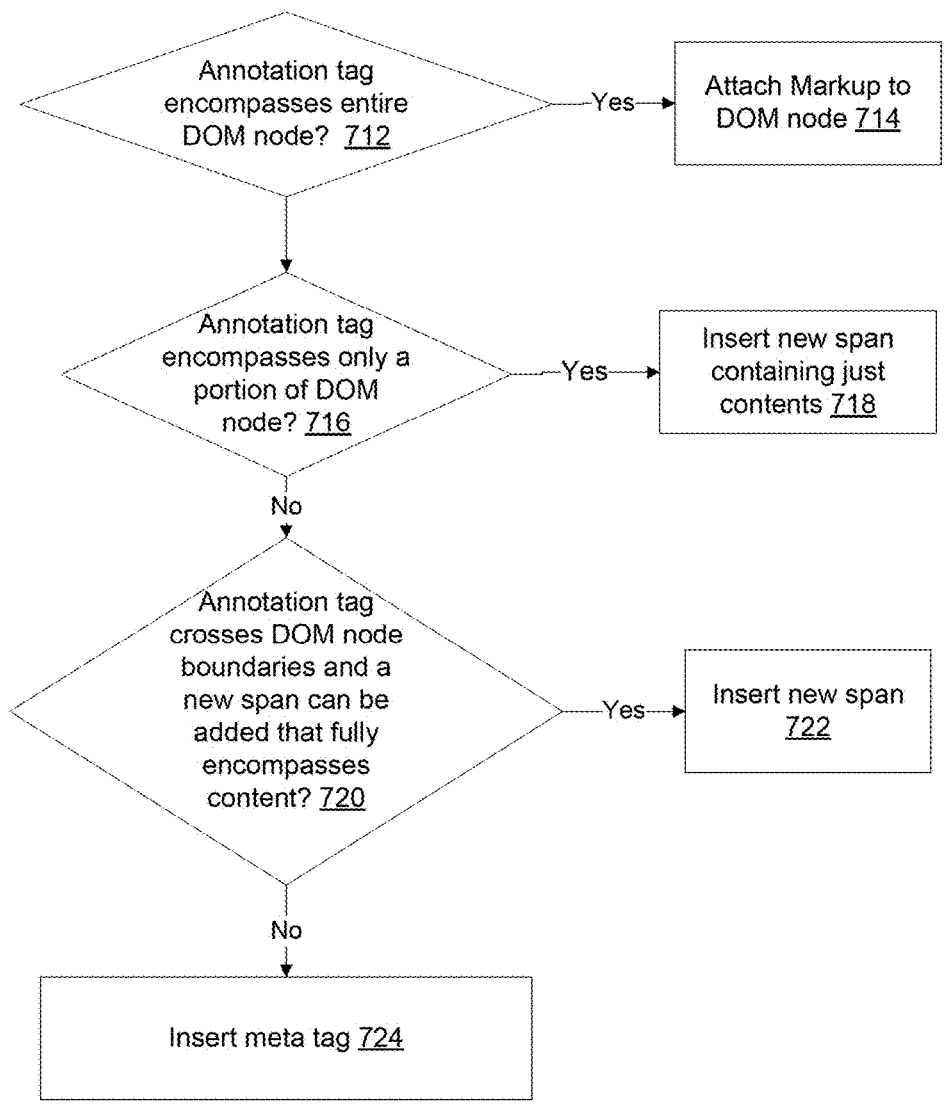
FIG. 7 is flow diagram illustrating a process for matching tags to DOM nodes, consistent with disclosed implementations.

FIG. 7 is flow diagram illustrating a process for matching tags to DOM nodes, consistent with disclosed implementations. The process shown in FIG. 7 may be implemented at least in part by the page markup system 100 shown in FIG. 1, for example using the page markup engine 122. The system may determine if an annotation tag encompasses an entire DOM node (712). If so (712, yes), the system may attach markup to the DOM node (714). For instance, <div>tagged</div> with the word "tagged" highlighted would become <div *microdata properties*>tagged</div>.

If not, (712, no), the system may determine if the annotation tag encompasses only a portion of the DOM node (716). If so, (716, yes), the system may insert a new span containing just the contents associated with the annotation tag (718). For instance, <div>untagged tagged untagged</ div> with the word tagged highlighted would become <div> untagged <span *microdata properties*>tagged</span>untagged</div>.

If not, (716, no), the system may determine if the annotation tag crosses DOM node boundaries and a new span can be added that fully encompasses the content associated with the annotation tag (720). If so (720, yes), the system inserts a new span (722). For instance, <div>tagged</div><div>tagged</div>becomes <span *microdata properties*><div>tagged</div><div>tagged</div></span>.

If not (720, no), the system inserts a meta tag (724). For instance, <div>untagged tagged</div><div>tagged untagged</div> becomes <div>untagged tagged</div><div>tagged untagged</div><meta *microdata properties* content="tagged tagged">.

Additionally, if an annotation tag includes a type "image" and refers to the contents of an HTML <a> tag but not the HTML <a> tag's SRC attribute, the system may insert a span inside the HTML <a> tag. While attaching and outputting data nodes, the system may perform special logic when necessary to transform an annotation schema into an output schema. For instance, the system may split a date range into a start date and end date, and include date contents in a format such as ISO-8601. The system may perform the process shown in FIG. 7 for all annotation tags received from a user at the same time, or one at a time as each annotation tag is received, as examples.

The system may then add all implied tags to the page, i.e., the parents of the directly applied tags that are not applied directly. To do this, the system may generate a DOM tree representation of the page, with all direct annotations applied to elements of the DOM tree (or to new elements inserted into the DOM tree). For each annotation tag not already present on the page, the system may perform a process as described below with respect to FIG. 8.

Figure 8:
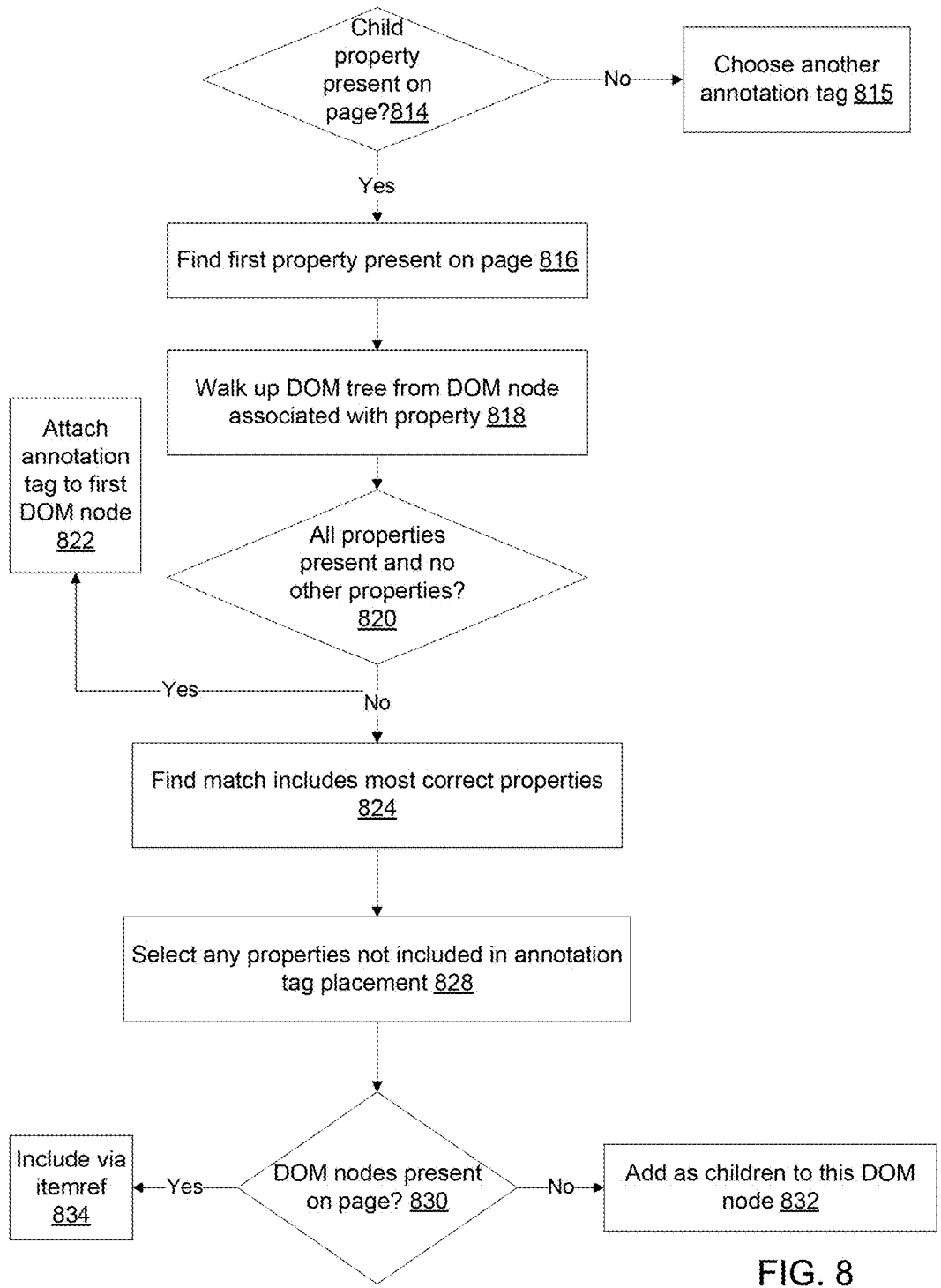
FIG. 8 is flow diagram illustrating a process for adding implied tags to a page, consistent with disclosed implementations.

FIG. 8 is flow diagram illustrating a process for adding implied tags to a page, consistent with disclosed implementations. For each tag not already present on the page, the system may determine if the tag has a child property present on the page (814). If not (814, no), the system may choose another annotation tag (815). If so, (814, yes), the system finds the first property present on the page (816). The system walks up the DOM tree from the DOM node associated with that property (818) in search of a DOM node that contains all properties of the current annotation tag. If all properties are present and no other properties are present (820, yes), the system attaches the annotation tag to the first DOM node (822) that meets this criteria. If other properties are present (820, no), the system finds the match that includes the most correct properties (824). This may be a single DOM node, or it may mean inserting a new span and migrating some children DOM nodes to this new span, and attaching the annotation tag to the span.

The system may then select any properties not included in the annotation tag placement (828). The system may determine if the DOM nodes associated with the properties are present on the page (830). If so, (830, yes), the system may include them via an HTML "itemref", if the DOM nodes associated with the properties are present on the page but not included within this DOM node. If the DOM nodes associated with the properties are not present on the page (830, no), the system may add them as children to this DOM node.

Figure 9:
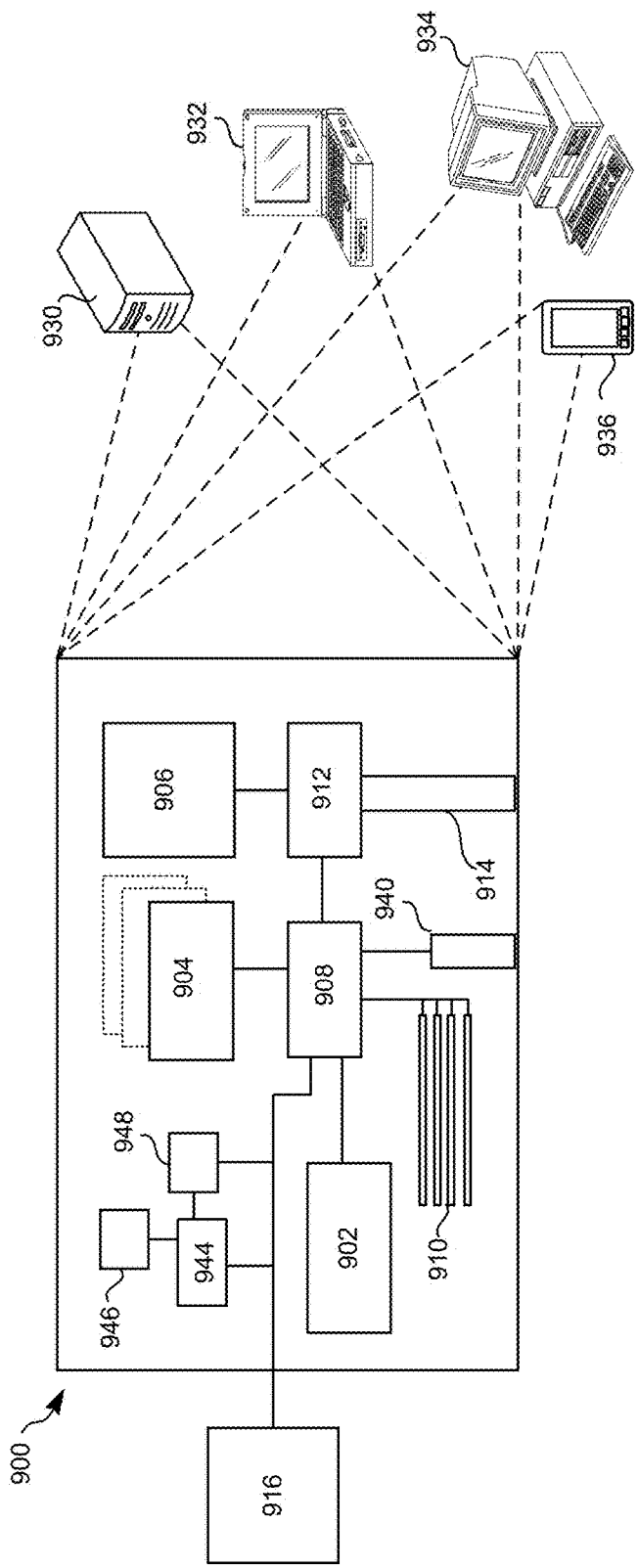
FIG. 9 shows an example of a computer device that can be used to implement the described techniques.

FIG. 9 shows an example of a generic computer device 900, which may be system 100 of FIG. 1 for example, which may be used with the techniques described here. Computing device 900 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 900 includes a processor 902, memory 904, a storage device 906, and expansion ports 910 connected via an interface 908. In some implementations, computing device 900 may include transceiver 946, communication interface 944, and a GPS (Global Positioning System) receiver module 948, among other components, connected via interface 908. Device 900 may communicate wirelessly through communication interface 944, which may include digital signal processing circuitry where necessary. Each of the components 902, 904, 906, 908, 910, 940, 944, 946, and 948 may be mounted on a common motherboard or in other manners as appropriate.

The processor 902 can process instructions for execution within the computing device 900, including instructions stored in the memory 904 or on the storage device 906 to display graphical information for a GUI on an external input/output device, such as display 916. Display 916 may be a monitor or a flat touchscreen display. In some implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In some implementations, the memory 904 may include expansion memory provided through an expansion interface.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 904, the storage device 906, or memory on processor 902.

The interface 908 may be a high speed controller that manages bandwidth-intensive operations for the computing device 900 or a low speed controller that manages lower bandwidth-intensive operations, or a combination of such controllers. An external interface 940 may be provided so as to enable near area communication of device 900 with other devices. In some implementations, controller 908 may be coupled to storage device 906 and expansion port 914. The expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 930, or multiple times in a group of such servers. It may also be implemented as part of a rack server system. In addition, it may be implemented in a personal computer such as a laptop computer 922, or smart phone 936. An entire system may be made up of multiple computing devices 900 communicating with each other. Other configurations are possible.

Figure 10:
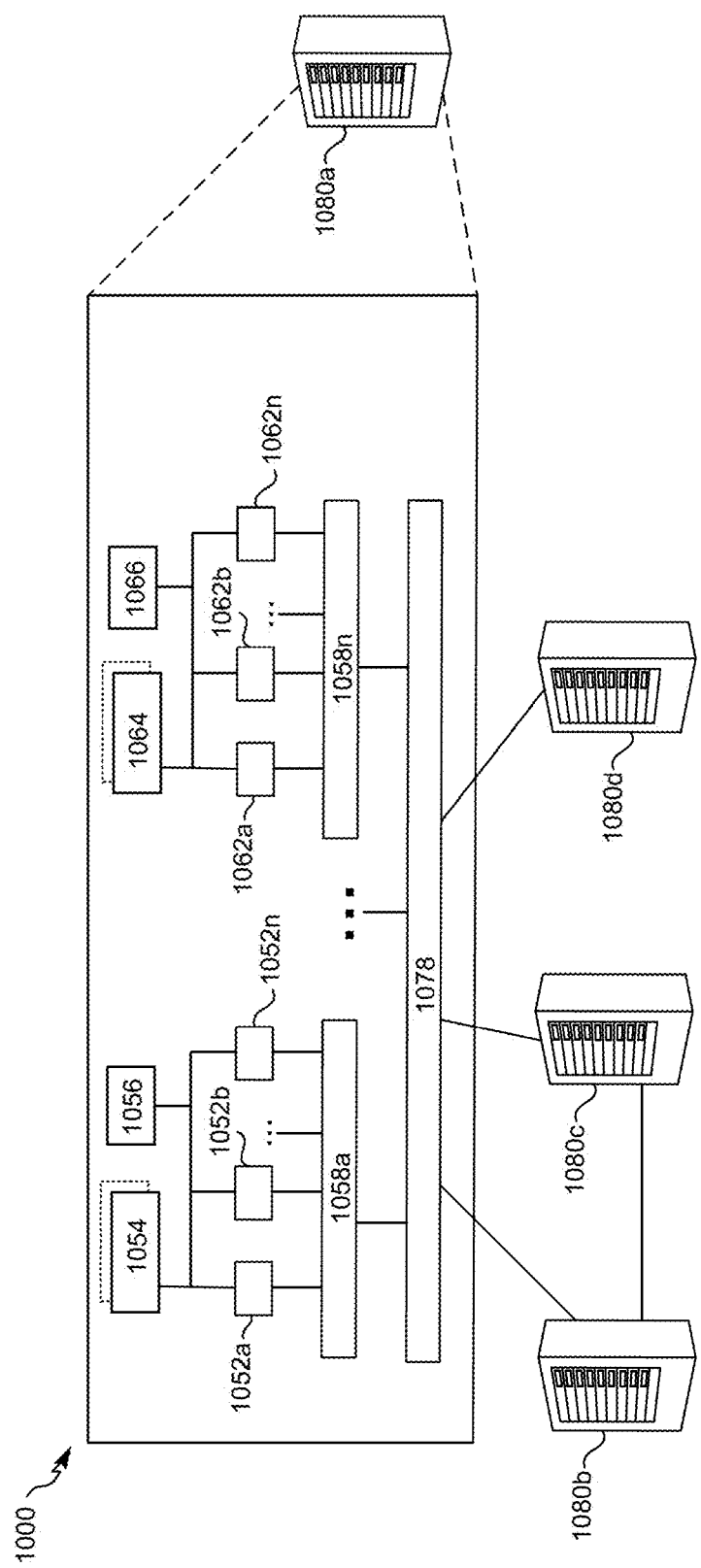
FIG. 10 shows an example of a distributed computer device that can be used to implement the described techniques.

FIG. 10 shows an example of a generic computer device 1000, which may be system 100 of FIG. 1, which may be used with the techniques described here. Computing device 1000 is intended to represent various example forms of large-scale data processing devices, such as servers, blade servers, datacenters, mainframes, and other large-scale computing devices. Computing device 1000 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1000 may include any number of computing devices 1080. Computing devices 1080 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1080a includes multiple racks 1058a-1058n. Each rack may include one or more processors, such as processors 1052a-1652n and 1062a-1662n. The processors may include data processors, network attached storage devices, and other computer controlled devices. In some implementations, one processor may operate as a master processor and control the scheduling and data distribution tasks. Processors may be interconnected through one or more rack switches 1058, and one or more racks may be connected through switch 1078. Switch 1078 may handle communications between multiple connected computing devices 1000, for example.

Each rack may include memory, such as memory 1054 and memory 1064, and storage, such as 1056 and 1066. Storage 1056 and 1066 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1056 or 1066 may be shared between multiple processors, multiple racks, or multiple computing devices and may include a computer-readable medium storing instructions executable by one or more of the processors. Memory 1054 and 1064 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1054 may also be shared between processors 1052a-1652n. Data structures, such as an index, may be stored, for example, across storage 1056 and memory 1054. Computing device 1000 may include other components not shown, such as controllers, buses, input/output devices, communications modules, etc.

An entire system, such as system 100, may be made up of multiple computing devices 1000 communicating with each other. For example, device 1080a may communicate with devices 1080b, 1080c, and 1080d, and these may collectively be known as system 100. As another example, system 100 of FIG. 1 may include one or more computing devices 1000 as graph building engine 114 the user interface 116. Furthermore, some of the computing devices may be located geographically close to each other, and others may be located geographically distant. The layout of system 1000 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
translating, by a processor of a computer device, a web page into a structured tree including a set of nodes;
displaying the web page in a first window;
receiving a selection of a portion of the displayed web page;
receiving, by the processor, an annotation tag based on the selection of the portion of the displayed web page;
translating, by the processor, the annotation tag into a markup by:
  determining that the annotation tag crosses a boundary between two nodes that both include content associated with the selection;
  determining that the annotation tag does not include all of the content of the two nodes because the two nodes encompass extra content in addition to the content associated with the selection; and
  based on determining that the annotation crosses the boundary, generating a single meta tag having a property that includes all of the content associated with the selection;
attaching, by the processor, the markup to a first node of the nodes;
displaying the web page in a source format in a second window that is displayed simultaneously with the first window, the web page in the source format including an annotated source document with a rendering of the markup;
automatically generating a selectable tag navigator based on the markup;
displaying in the first window or the second window the selectable tag navigator, the tag navigator providing a visual indicator of where markup has been added in the web page; and
in response to user selection of the tag navigator, automatically scrolling through both the web page in the first window to focus display on a visual element in the web page associated with the annotation tag and through the web page in the source format in the second window to focus display on the markup.

2. The method of claim 1, further comprising:
applying, by the processor, the markup to at least one parent node in the structured tree that is related to the first node; and
determining, by the processor, that the parent node in the structured tree is related to the first node by traversing the structured tree from the first node for any nodes that contain properties of the annotation tag associated with the first node.

3. The method of claim 1, further comprising:
determining that the annotation tag encompasses only a portion of the first node; and
inserting a new span containing contents associated with the selection.

4. The method of claim 1, further comprising:
receiving an input of an email element in a user interface;
receiving an annotation tag based on a selection of a portion of the email element and an annotation associated with the selection;
translating the annotation into a markup; and
displaying, adjacent to the user interface, a new version of the email element in a source format, the new version of the email element including a new file having an annotated source document with a rendering of the markup.

5. The method of claim 3, further comprising:
determining that the annotation tag crosses two node boundaries that include text content associated with the selection; and
inserting the new span to include the text content.

6. The method of claim 1, wherein the structured tree is a document object model (DOM) tree.

7. The method of claim 1, wherein the web page in the source format is based on the structured tree.

8. The method of claim 1, wherein the markup is in an HTML5 microdata format.

9. The method of claim 1, further comprising:
matching, by the processor, the selection to the first node and automatically populating text associated with the first node.

10. The method of claim 1, wherein the tag navigator is displayed on a scroll bar of the first window or on a scroll bar of the second window.

11. A non-transitory computer readable medium containing instructions that when executed by a processor of a computing device cause the processor to:
receive an input of an address for a web page;
translate the web page into a structured tree including a set of nodes;
display the web page in a first window;
receive a selection of a portion of the displayed web page;
receive, using a graphical user interface, an annotation tag based on the selection of a portion of the web page and an annotation associated with the selection;
translate the annotation tag into a markup by:
  determining that the annotation tag crosses a boundary between two nodes that both include content associated with the selection;
  determining that the annotation tag does not include all of the content of the two nodes because the two nodes encompass extra content in addition to the content associated with the selection; and
  based on determining that the annotation tag crosses the boundary, generating a single meta tag having a property that includes all of the content associated with the selection;
attach the markup to a first node of the nodes;
display, the web page in a source format, the web page in the source format in a second window that is displayed simultaneously with the first window, the web page in the source format including an annotated source document that includes a rendering of the markup according to the at least one selected item type;
automatically generate a selectable tag navigator based on the markup;
display in the first window or the second window the selectable tag navigator, the tag navigator providing a visual indicator of where markup has been added in the web page; and
in response to user selection of the tag navigator, automatically scroll through both the web page in the first window to focus display on a visual element in the web page associated with the annotation tag and through the web page in the source format in the second window to focus display on the markup.

12. The non-transitory computer readable medium of claim 11, wherein the instructions further cause the processor to:
apply the markup to at least one parent node in the structured tree that is related to the first node; and determine the parent node in the structured tree that is related to the first node by traversing the structured tree from the first node for any nodes that contain properties of the annotation tag.

13. The non-transitory computer readable medium of claim 11, wherein the instructions further cause the processor to:
   determine that the annotation tag encompasses only a portion of the first node; and
   insert a new span associated with contents of the web page that are associated with the selection.

14. A system comprising:
   a display;
   a memory; and
   a processor operably coupled to the memory and configured to execute:
      converting a web page into a structured tree including a set of nodes;
      displaying the web page in a first window on the display;
      receiving a selection of a portion of the displayed web page;
      receiving an annotation tag based on the selection of a portion of the web page and an annotation associated with the selection, the annotation being selected from a menu provided in a graphical user interface, the menu including a plurality of selectable item types to associate with the portion, the plurality of selectable item types being provided in the graphical user interface based at least in part on a schema associated with the web page;
      translating the annotation tag into a markup according to at least one of the item types by:
         determining that the annotation tag crosses a boundary between two nodes that both include content associated with the selection;
         determining that the annotation tag does not include all of the content of the two nodes because the two nodes encompass extra content in addition to the content associated with the selection; and
         based on determining that the annotation tag crosses the boundary,
         generating a single meta tag having a property that includes all of the content associated with the selection;
      attaching the markup to a first node of the nodes;
      displaying the web page in a source format in a second window in the display, the web page in the source format including an annotated source document with a rendering of the markup according to the at least one selected item type;
      automatically generating a selectable tag navigator based on the markup;
      displaying in the first window or the second window the selectable tag navigator, the tag navigator providing a visual indicator of where markup has been added in the page; and
      in response to user selection of the tag navigator, automatically scrolling through both the web page in the first window to focus display on a visual element in the web page associated with the annotation tag and through the web page in the source format in the second window to focus display on the markup.

15. The system of claim 14, further comprising:
   determining that the annotation tag encompasses only a portion of the first node; and
   inserting a new span containing contents of the web page that are associated with the selection.

16. The system of claim 15, further comprising:
   determining that the annotation tag crosses multiple node boundaries; and
   inserting the new span.

17. The system of claim 15, wherein the structured tree is a document object model (DOM) tree.

18. The system of claim 14, wherein the web page in the source format is based on the structured tree.

19. The system of claim 14, wherein the markup is in an HTML5 format.

20. The system of claim 14, wherein the web page in the source format includes the markup in a highlighted format.

* * * * *

UNITED STATES PATENT AND TRADEMARK OFFICE
CERTIFICATE OF CORRECTION

PATENT NO.       : 10,002,117 B1
APPLICATION NO.  : 14/062498
DATED            : June 19, 2018
INVENTOR(S)      : Ain It is certified that error appears in the above-identified patent and that said Letters Patent is hereby corrected as shown below:

On the Title Page

On Page 2, Column 1, Item "(56)", under "OTHER PUBLICATIONS", Lines 5-8, delete "Ali Khalili, Soren Auer, and Daniel Hladky, "The RDFa Content Editor--From WYSIWYG to WYSIWYM", copyright Jul. 2012, published in Computer Software and Applications Conference (COMPSAC), 2012 IEEE 36th Annual, pp. 531-540.*"

Signed and Sealed this
Eleventh Day of December, 2018

Andrei Iancu
*Director of the United States Patent and Trademark Office*